US008296201B2

(12) United States Patent
Sherman

(10) Patent No.: US 8,296,201 B2
(45) Date of Patent: Oct. 23, 2012

(54) ELECTRONIC DEVICE USED TO RECORD EXPENDITURES

(76) Inventor: Georgia Sherman, West St. Paul, MN (US)

( * ) Notice: Subject to any disclaimer, the term of this patent is extended or adjusted under 35 U.S.C. 154(b) by 0 days.

(21) Appl. No.: 13/199,808

(22) Filed: Sep. 9, 2011

(65) Prior Publication Data
US 2012/0066100 A1   Mar. 15, 2012

Related U.S. Application Data

(60) Provisional application No. 61/381,142, filed on Sep. 9, 2010.

(51) Int. Cl.
*G07B 17/00* (2006.01)
(52) U.S. Cl. ............. 705/30; 708/106; 235/379
(58) Field of Classification Search ............ 705/14; 708/106; 235/379
See application file for complete search history.

(56) References Cited

U.S. PATENT DOCUMENTS

| | | | | |
|---|---|---|---|---|
| 4,587,409 | A * | 5/1986 | Nishimura et al. | 235/380 |
| 7,401,741 | B2 * | 7/2008 | Thayer | 235/492 |
| 2003/0004876 | A1 * | 1/2003 | Jacobson | 705/41 |
| 2004/0236647 | A1 * | 11/2004 | Acharya | 705/30 |
| 2009/0204539 | A1 * | 8/2009 | Parker | 705/41 |
| 2010/0274830 | A1 * | 10/2010 | Stever | 708/132 |

OTHER PUBLICATIONS

Morgenstern M., The personal information revolution from portable computing to the intelligent pocket assistant, Feb. 26, 1990, Compcon, Thirty Fifth IEEE Computer Sociaety International Conference, p. 616-622.*

* cited by examiner

*Primary Examiner* — Marissa Thein
*Assistant Examiner* — Milena Racic
(74) *Attorney, Agent, or Firm* — Jacobson and Johnson; Thomas N Phung

(57) ABSTRACT

A non-internet accessible, lightweight, compact expenditure recording electronic device comprising a housing having a front face and an opposing rear face, a processor located within the housing for processing data associated with a single financial account, a memory for storing data associated with the single financial account with the memory in electronic communication with the processor, a screen attached to the housing at the front face with the screen coupled to be operable by the processor to display data of the single financial account to a user of the device, a plurality of input keys disposed on the front face of the housing for inputting data to the memory and track changes to the data for the single financial account, and a communication port disposed on the housing and configured to connect to the memory.

12 Claims, 1 Drawing Sheet

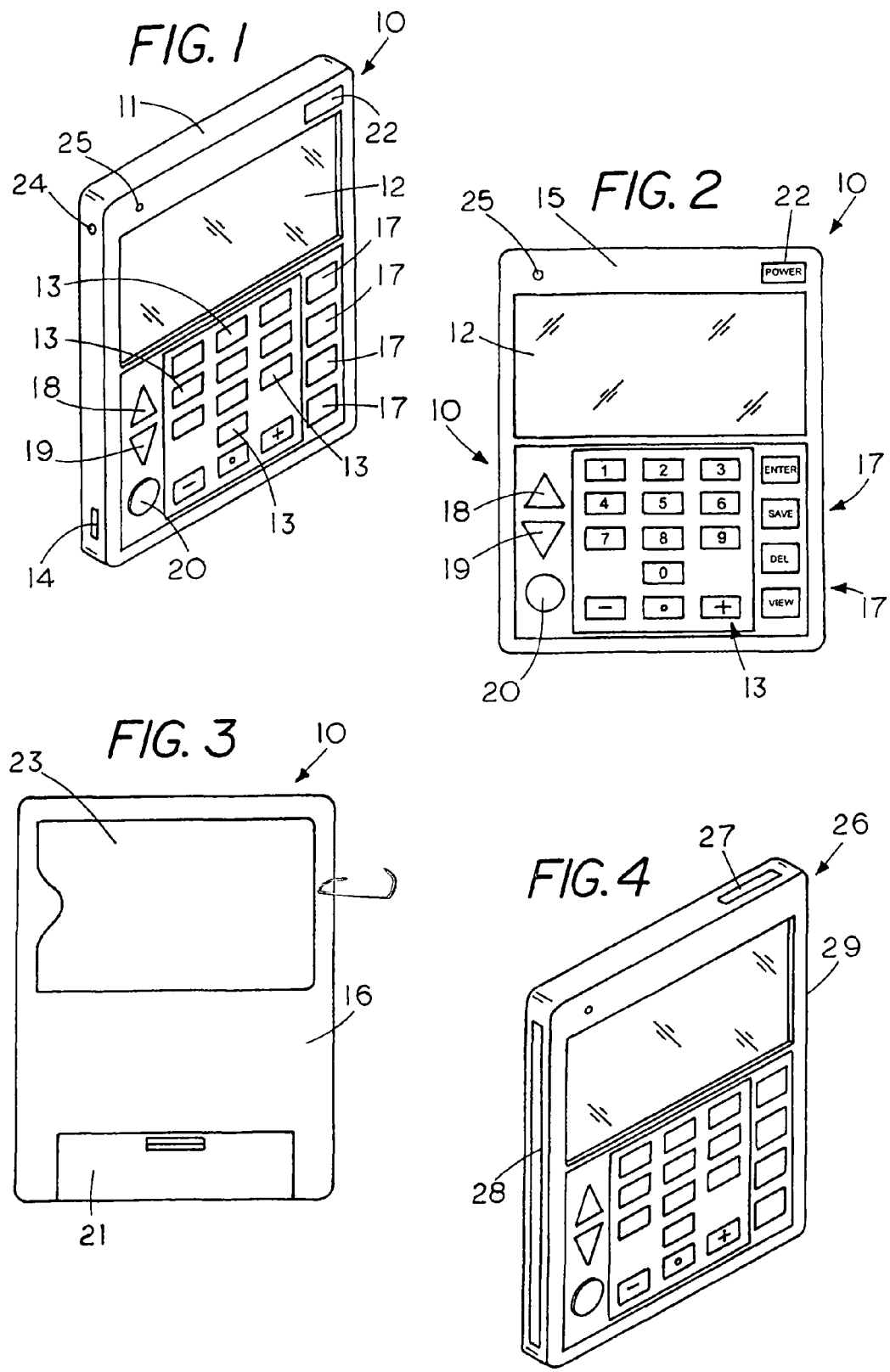

ELECTRONIC DEVICE USED TO RECORD EXPENDITURES

CROSS REFERENCE TO RELATED APPLICATIONS

This application claims priority to currently pending U.S. Provisional Application Ser. No. 61/381,142; filed on Sep. 9, 2010; titled ELECTRONIC DEVICE USED TO RECORD EXPENDITURES.

FIELD OF THE INVENTION

This invention relates to devices in assisting in personal budget keeping and, more specifically, to a small, portable, lightweight non-internet accessible expenditure recording electronic device.

STATEMENT REGARDING FEDERALLY SPONSORED RESEARCH OR DEVELOPMENT

None

REFERENCE TO A MICROFICHE APPENDIX

None

BACKGROUND OF THE INVENTION

Budgeting has never been this difficult in all of history. One used to see people cashing their check at the end of the week, banking most of it, and keeping their spending allowance in their pocket. This was a fairly easy method of keeping track of how much money one had at one's disposal; all one needed to do was look in one's pocket.

Nowadays, one need to get to a cash machine and ask for a balance or get to a computer or smart phone and take a peek. Everything is done on plastic and becoming increasingly illusive.

There is great truth in the saying, "If you watch your pennies, your dollars will take care of themselves." Unfortunately, there is no convenient way to watch one's pennies anymore. Although the number of times a person swipes a card on an daily average may vary from person to person, there are some days that the frequency can be mind-boggling, especially during the holidays. The average person just isn't equipped with a simple, efficient method to track expenditures, especially at the same frequently they may be swiping in this plastic economy. We have created a new currency system, which takes a little more effort to understand than our former paper system. This new currency system seems to have made its way into people's lives with little or no preparation, and the consequences have been financial disaster for many.

The present invention is simple a device to operate and provides a quick, on-the-spot method to maintain a running balance of expenditures. It's not meant to replace a detailed accounting practice, nor is it intended to replace reconciliation with one's bank account on a periodic basis. Its purpose is to keep the user from getting lost in a world where innocent swiping significantly increases the user's chances of overspending. The present invention was created as a stopgap tool to keep the user informed of the user's budget balance as the user goes through the day swiping the user's cards.

Since the Device of the present invention is easy to use and affordable, one may consider owning several and dedicating each to a special project, such as:

a vacation where the user wishes to stay within a budget;
keeping track of a credit card balance;
keeping track of the user debit card;
tracking a monthly household budget; and
helping a child learn about saving and spending.

It is envisioned that a system where loan institutions, bankruptcy clinics, social security programs, unemployment programs and welfare systems equip their recipients with a device of the present invention in order to help them make wise, well-informed decisions as they spend their limited resources. With banks using clever formulas to charge huge fees for just about every checking account error one could possibly make, isn't it time that everyone equip themselves with a tool to prevent these costly mistakes? People on limited incomes cannot afford a $35 over-draft fee simply because they went a few dollars over their bank balance. It is time to empower people with a convenient, easy to use, budgeting tool so they have a chance to wisely manage their finances.

PRIOR ART

U.S. Pat. No. 5,272,319 teaches a memory holder for a financial card, which provides a compartment for holding one financial card, calculator, and memory for processing and storing transactions related to same financial card. This memory holder also provides a warning means for reminding the user of this device to record any new transaction once the financial card has been re-inserted in the device.

U.S. Pat. No. 5,272,319 a device for holding credit cards, bank cards, charge cards, or any similar type of card is disclosed having a compartment for holding the card, switching elements which are activated by the card, and a warning device that is activated by the switching elements.

U.S. Pat. No. 6,324,556 an apparatus for organizing data associated with each of a plurality of cards comprising a microcontroller, memory for storing said data associated with each said card, selecting means for selecting data from said memory associated with each said card, input means wherein said input means communicates with said microcontroller to store data to said memory for each said card and track changes to said data for each said card, in a first operable position when each said card is in a retracted position respectively.

BRIEF SUMMARY OF THE INVENTION

Briefly, the present invention comprises a non-internet accessible, lightweight, compact expenditure recording electronic device that comprises a housing having a front face and an opposing rear face, a processor located within the housing, a memory for storing data associated with a single financial account with the memory in electronic communication with the processor. For convenience and portability, the housing preferably has a width of less than 1 cm. The expenditure recording electronic device includes a screen attached to the housing at the front face with the screen coupled to be operable by the processor to display data of the single financial account to a user of the device. Preferably, the screen is sized to display at least 3 transactions thereon.

The expenditure recording electronic device also includes a plurality of input keys disposed on the front face of the housing for inputting data to the memory and track changes to the data for the single financial account. The plurality of input keys includes a label key for accessing a set of at least 10 basic transaction identification labels.

The expenditure recording electronic device further includes a communication port disposed on the housing and configured to connect to the memory, a memory card slot disposed on the housing and in electronic communication with the processor and supporting an electronic flash memory data storage device therein, and a cardholder located on the housing and in non-electronic communication with the processor.

In one embodiment the cardholder of the expenditure recording electronic device may comprise a spring-loaded slot located within the housing. In an alternative embodiment the cardholder of the expenditure recording electronic device may comprise a sleeve attached to the rear face of the housing.

BRIEF DESCRIPTION OF THE DRAWINGS

FIG. 1 is a perspective view of an exemplary embodiment of the present invention;

FIG. 2 is a front view of the exemplary embodiment of the present invention shown in FIG. 1;

FIG. 3 is a rear view of the exemplary embodiment of the present invention shown in FIG. 1; and FIG. 4 is a perspective view of an alternative embodiment of the device of FIGS. 1-3.

DESCRIPTION OF THE PREFERRED EMBODIMENT

FIG. 1 is a perspective view showing an embodiment of a non-internet accessible expenditure recording electronic device 10 of the present invention for providing a way to record spending as it occurs and to help people keep track of spending.

As shown in the FIGS. 1-3, expenditure recording electronic device 10 comprise of a housing 11, a screen 12, a plurality of input keys, and a communication port 14. The housing may have a front face 15 and an opposing rear face 16. A processor may be disposed within the housing 11 along with a memory for storing data associated with a single financial account with the memory in electronic communication with the processor. The screen 12 may be attached to the housing 11 at the front face 15 in which the screen 12 is coupled to be operable by the processor to display data to a user of the expenditure recording electronic device 10. In order to provide for a portable and lightweight device, housing 10 preferable comprises a width of less than 1 cm and more preferably comprises a width of less than 1 mm.

The plurality of input keys preferably is located on the front face 15 of the housing 11. Although the communication port 14, such as a universal serial bus (USB) and/or a High-Definition Multimedia Interface (HDMI), for example, is shown located on a side of the housing 11, the communication port 14 may alternatively be disposed either on the front face 15 or the opposing rear face 16 of housing 11. The communication port may be configured to connect to a storage device or a computer (not shown).

As shown in FIGS. 1 and 2, in an exemplary embodiment of the present invention, the plurality of keys may include numeric keypad 13, control buttons 17 comprising of an enter key, a save key, a view key, a toggle up key 18, a toggle down key 19, and a category key 20. The non-internet accessible expenditure recording electronic device 10 may further include a power source, such as battery, for example, supported in a battery compartment 21.

In the embodiment of FIGS. 1, 2, and 3, expenditure recording electronic device 10 is shown further including a power switch 22, credit/debit card holder 23 located on the opposing rear face 16 of housing 11, an optional battery charger/AC port 24, and a low battery indicator 25 in the front surface of the housing. A feature of the present invention is that credit/debit cardholder 23 is isolated from both the processor or the memory. Another exemplary embodiment of the present invention may be powered by solar energy.

Referring to FIG. 4, FIG. 4 is a perspective view of an alternative embodiment of expenditure recording electronic device 26 similar to the expenditure recording electronic device 10 of FIGS. 1-3. However, expenditure recording electronic device 26 is shown including a memory card slot 27 disposed on a housing 29 with memory card slot 27 in electronic communication with a processor of expenditure recording electronic device 26. Memory card slot 27 is configured to support an electronic flash memory data storage device, including but not limited to Flash Memory, SD Card, SD Memory Card, USB Flash Memory, Flash Memory Card, Compact Flash Memory therein.

Expenditure recording electronic device 26 is also shown including a cardholder comprises a spring-loaded cardholder slot 28 located within the housing 29. Although spring-loaded cardholder slot 28 is located within the housing 29, similar to credit/debit cardholder 23, spring-loaded cardholder slot 28 is isolated from both the processor or the memory expenditure recording electronic device 26.

In operation, a user may power on an exemplary embodiment of the present invention. The user may prepare the exemplary embodiment of the present invention to accept a transaction, assign transaction number, date, and time. The user may further choose a transaction type, such as a category. In addition, the user may choose an exemplary embodiment of the present invention to record amount of transaction. The user may use toggle up or down keys to scroll through transactions. The save key may be used to update balance.

In an exemplary embodiment of the present invention, specific keys may enable the user to record an expenditure, subtract an amount from the balance or add a deposit to the balance. An exemplary embodiment of the present invention may enable a user to maintain a current spending and deposit record.

An exemplary embodiment of the present invention may be programmed to upload files to a storage device or a computer.

An exemplary embodiment of the present invention may be used as an electronic ledger for recording debit transactions, budget expenditures or credit card transactions. An exemplary embodiment of the present invention may be used as a budget tool for various uses, such as vacation spending, savings, or education expenses, for example.

Detail Example of the Operation of the Expenditure Recording Electronic Device

1. Power on the device
2. Press ENTER 17 to prepare the device to accept a transaction. In this mode the screen will display a transaction number, date and time.
3. Label the Transaction by pressing the CATEGORY key 20 and strolling up and down on the TOGGLE keys 18 and 19 to choose appropriate label after which press the SAVE key (FIG. 2).
4. Choose "+" key for deposit or "−" for deductions.
5. Type in the amount of the transaction and then press SAVE Key to lock it in.

For example, a deposit of $2000.00 to an initial balance of $2789.00 would result in the following display on screen 12:

| Record 1 | March 8, 2011 | 8:30 pm |
|---|---|---|
| Deposit | | +$2000.00 |
| Balance | | $4789.00 |

6. As shown, the Balances are updated after each transaction and screen 12 is preferably sized to display up to at least 3 transactions. For example, if there was two additional transaction of a deduction of $500 for housing and a deduction of $60 for gas, screen 12 will display the following:

|  |  |  |
|---|---|---|
| Record 1 | March 8, 2011 | 8:30 pm |
| Deposit |  | +$2000.00 |
| Balance |  | $4789.00 |
| Record 2 | March 10, 2011 | 1:00 pm |
| House |  | −500.00 |
| Balance |  | $4289.00 |
| Record 3 | March 8, 2011 | 2:30 pm |
| Gas |  | −60.00 |
| Balance |  | $4229.00 |

It should be understood, of course, that the foregoing relates to exemplary embodiments of the invention and that modifications may be made without departing from the spirit and scope of the invention as set forth in the following claims.

I claim:

1. A non-internet accessible expenditure recording electronic device comprising:
   a housing having a front face and an opposing rear face and a width defined by a distance between said front face and said opposing rear face of less than 1 cm;
   a processor located within said housing for processing data associated with a single financial account;
   a memory storing data and maintaining a running balance of expenditures associated with said single financial account, said memory in electronic communication with said processor;
   a screen attached to the housing at the front face, said screen coupled to be operable by the processor to display data of said single financial account to a user of said device;
   a plurality of input keys disposed on the front face of the housing, said input keys for inputting data to said memory and track changes to said data for said single financial account;
   a label key for accessing a set of at least 10 basic transaction identification labels including the transaction identification label titled "house" and the transaction identification label titled "gas";
   a cardholder attached directly to said rear face of said housing and in non-electronic communication with said processor; and
   a communication port disposed on the housing, the communication port configured to connect to said memory.

2. The non-internet accessible expenditure recording electronic device of claim 1 including a memory card slot disposed on said housing and in electronic communication with said processor, said memory card slot configured to support an electronic flash memory data storage device therein.

3. The non-internet accessible expenditure recording electronic device of claim 1 wherein said screen is sized to display at least 3 transactions.

4. A non-internet accessible expenditure recording electronic device comprising:
   a housing having a front face and an opposing rear face and a width defined by a distance between said front face and said opposing rear face of less than 1 cm;
   a processor located within said housing;
   a memory storing data and maintaining a running balance of expenditures associated with a single financial account, said memory in electronic communication with said processor;
   a screen attached to the housing at the front face, said screen coupled to be operable by the processor to display data of said single financial account to a user of said device;
   a plurality of input keys disposed on the front face of the housing, said input keys for inputting data to said memory and track changes to said data for said single financial account;
   a label key for accessing a set of at least 10 basic transactions identification labels including the transaction identification label titled "house" and the transaction identification label titled "gas";
   a communication port disposed on the housing, the communication port configured to connect to said memory;
   a memory card slot disposed on the housing and in electronic communication with said processor, said memory card slot configured to support an electronic flash memory data storage device therein; and
   a cardholder attached directly to said rear face of said housing and in non-electronic communication with said processor.

5. The non-internet accessible expenditure recording electronic device of claim 4 wherein said cardholder comprises a spring-loaded slot located within said housing.

6. The non-internet accessible expenditure recording electronic device of claim 4 wherein said cardholder is attached directly to said rear face of said housing.

7. The non-internet accessible expenditure recording electronic device of claim 4 wherein said housing comprises a width of less than 1 mm.

8. The non-internet accessible expenditure recording electronic device of claim 4 wherein said screen is sized to display at least 3 transactions.

9. The non-internet accessible expenditure recording electronic device of claim 4 wherein said set of transaction identification labels comprises at least 63 basic transaction identification labels.

10. A non-internet accessible expenditure recording electronic device comprising:
    a housing having a front face and an opposing rear face and a width defined by a distance between said front face and said opposing rear face of less than 1 cm;
    a processor located within said housing;
    a memory storing data and maintaining a running balance of expenditures associated with a single financial account, said memory in electronic communication with said processor;
    a screen attached to the housing at the front face, said screen coupled to be operable by the processor to display data of said single financial account to a user of said device, said screen sized to display at least 3 transactions;
    a plurality of input keys disposed on the front face of the housing, said input keys for inputting data to said memory and track changes to said data for said single financial account;
    a label key for accessing a set of at least 10 basic transaction identification labels including the transaction identification label titled "house" and the transaction identification label titled "gas";
    a communication port disposed on the housing, the communication port configured to connect to said memory;

a memory card slot disposed on the housing and in electronic communication with said processor, said memory card slot configured to support an electronic flash memory data storage device therein; and a cardholder attached directly to said rear face of said housing and in non-electronic communication with said processor.

11. The non-internet accessible expenditure recording electronic device of claim 10 wherein said cardholder comprises a spring-loaded slot located within said housing.

12. The non-internet accessible expenditure recording electronic device of claim 10 wherein said cardholder is attached directly to said rear face of said housing.

* * * * *